Feb. 6, 1923.  1,444,689.
J. S. KENLAY.
BUMPER.
FILED SEPT. 11, 1922.  3 SHEETS—SHEET 1.
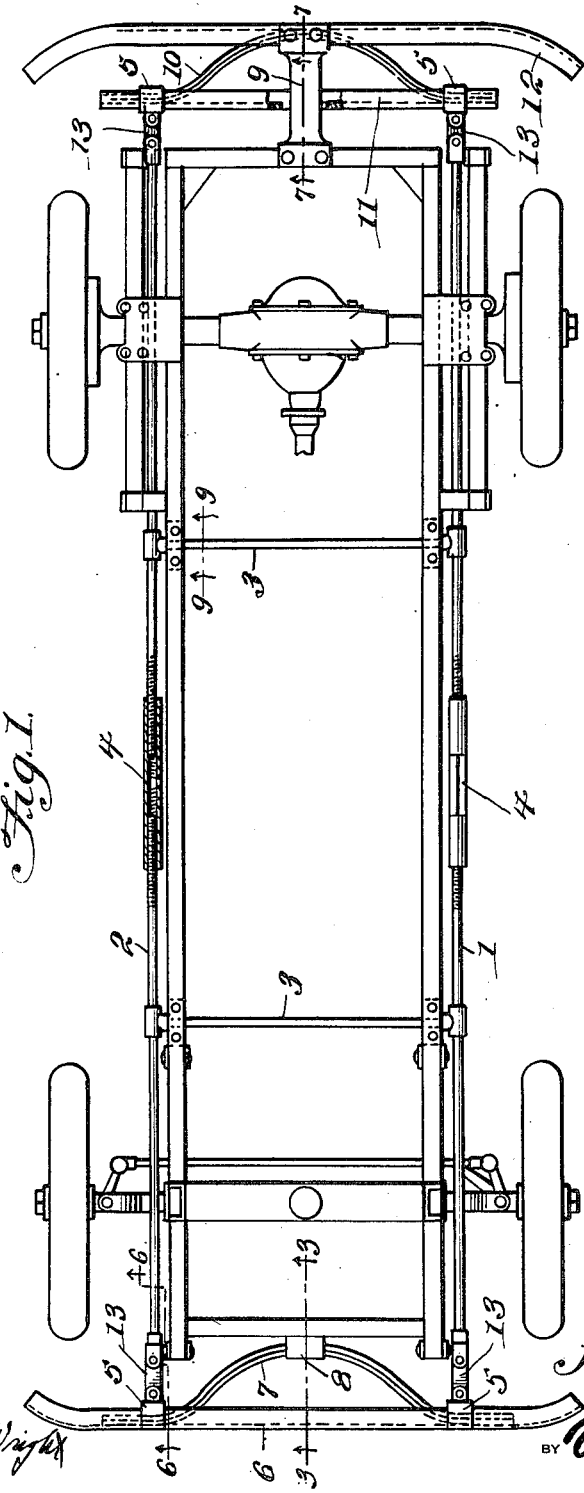
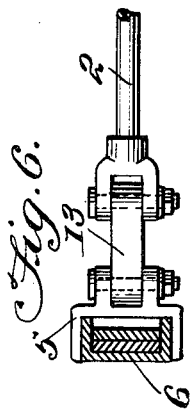
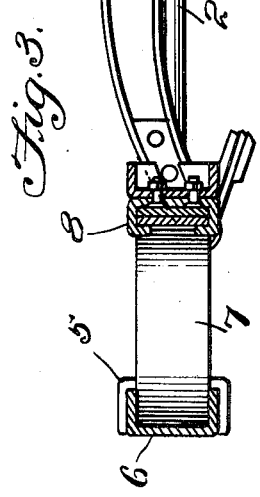
John S. Kenlay
INVENTOR
BY Victor J. Evans
ATTORNEY

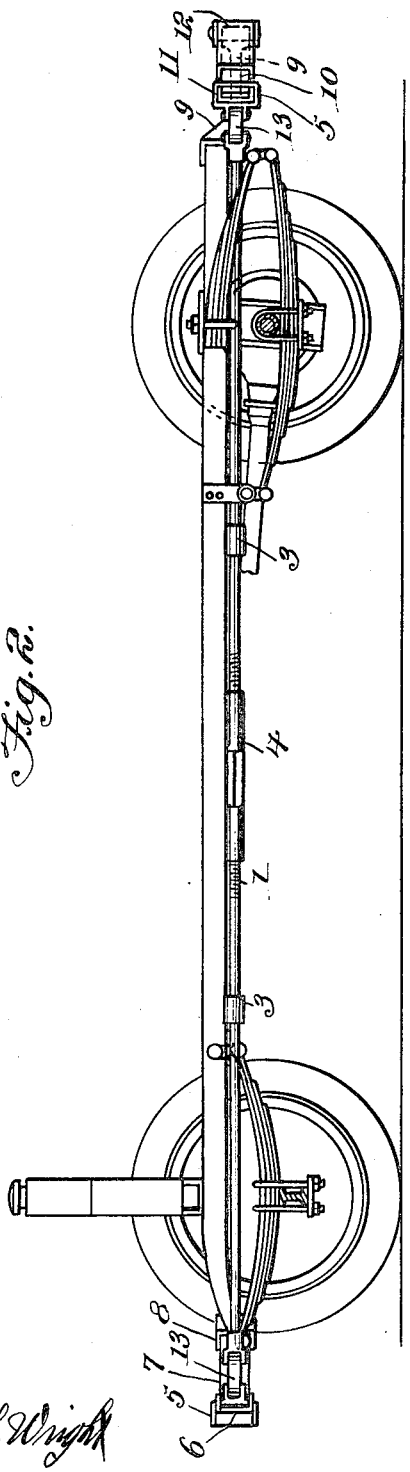
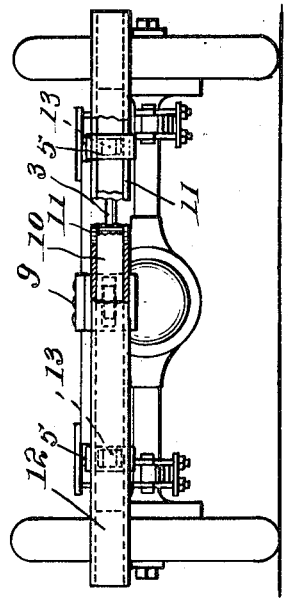
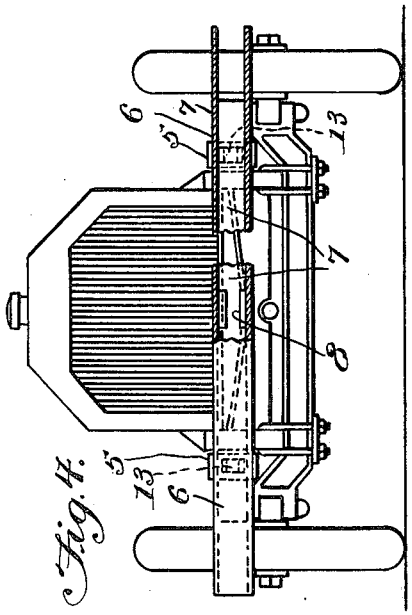

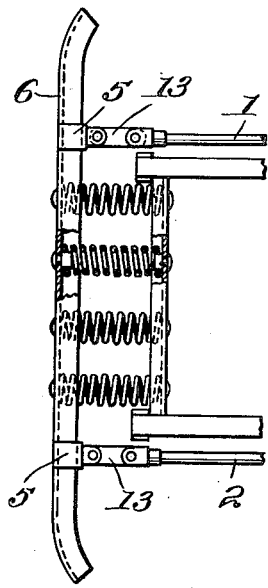
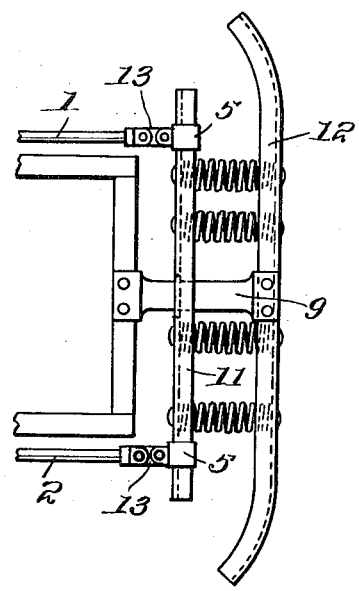
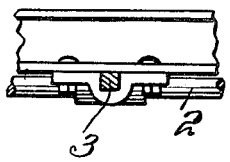
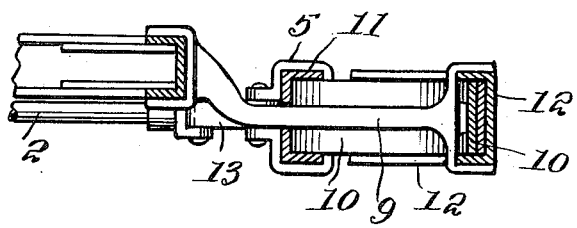
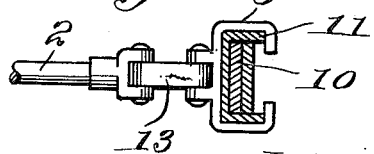

Patented Feb. 6, 1923.

1,444,689

UNITED STATES PATENT OFFICE.

JOHN S. KENLAY, OF DANVILLE, ILLINOIS.

BUMPER.

Application filed September 11, 1922. Serial No. 587,472.

*To all whom it may concern:*

Be it known that I, JOHN S. KENLAY, a citizen of the United States, residing at Danville, in the county of Vermilion and State of Illinois, have invented new and useful Improvements in Bumpers, of which the following is a specification.

This invention relates to a combined bumper and shock absorber for motor vehicles, the general object of the invention being to provide means for preventing a collision from damaging the vehicle and also to prevent the shocks of such a collision from being communicated to the frame and other parts of the vehicle.

Another object of the invention is to provide spring means at the front and rear of the vehicle with means for distributing the force of a collision to such means.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view showing a chassis of a motor vehicle with my invention in use.

Figure 2 is a side view of Figure 1.

Figure 3 is a longitudinal sectional view taken on line 3—3 of Figure 1.

Figure 4 is a view of the front end of a motor vehicle supplied with my invention.

Figure 5 is a rear view thereof.

Figure 6 is a section on line 6—6 of Figure 1.

Figure 7 is a section on line 7—7 of Figure 1.

Figure 8 is a sectional view showing the connection of the member 2 with the rear brace and rear spring.

Figure 9 is a section on line 9—9 of Figure 1.

Figures 10 and 11 are views showing the use of coil springs instead of leaf springs for supporting the front and rear bumpers.

In these views 1 and 2 indicate side bars which are slidably supported by the cross bars 3 which are fastened to the frame. The side bars 1 and 2 are adjustable longitudinally by means of the threaded parts 4. Socket members 5 are secured to the ends of the side bars and the front sockets support the front bumper 6 and receive the ends of the front spring 7 which is secured to the front of the vehicle by the bracket 8. A support 9 is secured to the rear of the vehicle for supporting the rear spring 10 which engages the sockets 5 at the rear end of the side bars 1. A rear brace 11 has its ends engaging the sockets of the rear side bars and has a central opening through which the support 9 passes. The rear bumper 12 is attached solidly to the support 9. The sockets are connected with the side bars by a knuckle joint, as shown at 13.

From the above it will be seen that if a vehicle should run into another vehicle or any other object the force of the blow will be distributed between the front and rear springs by means of the bars 1 and 2, the blow being communicated to the rear spring through the brace 11 which is connected with the rear ends of the side bars. Thus the strain of a collision is taken from the body and frame and is absorbed by the front and rear springs. By making the parts adjustable it can be fitted for vehicles of different sizes. Coil springs can be used in place of the leaf springs when desired, such as shown in the detail views.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a vehicle, side bars slidably connected with the frame thereof, a bumper connected with the front end of the side bars, a spring supported on the vehicle and having its ends engaging the front end of the side bars, a brace connecting the rear ends of the side bars together, a spring supported from the vehicle and engaging said brace and a rear bumper extending beyond the rear spring and brace.

2. In combination with a vehicle, a number of cross bars connected with the frame thereof, a pair of side bars slidably supported by said cross bars, sockets at the ends of said side bars, a bumper supported by the front sockets, a spring for resisting the rearward movement of the bumper and side bars, a brace connecting the rear sockets together, a support passing through the brace, a spring supported thereby and having its ends engaging the rear sockets and a bumper carried by said support.

In testimony whereof I affix my signature.

JOHN S. KENLAY.